US009592743B2

(12) United States Patent
Haug

(10) Patent No.: US 9,592,743 B2
(45) Date of Patent: Mar. 14, 2017

(54) MOBILE DISCHARGE DEVICE FOR A BATTERY AND MOTOR VEHICLE COMPRISING A MOBILE DISCHARGE DEVICE

(71) Applicants: Robert Bosch GmbH, Stuttgart (DE); Samsung SDI Co., Ltd., Yongin-si, Gyeonggi-do (KR)

(72) Inventor: Karsten Haug, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 321 days.

(21) Appl. No.: 14/094,861

(22) Filed: Dec. 3, 2013

(65) Prior Publication Data

US 2014/0152263 A1 Jun. 5, 2014

(30) Foreign Application Priority Data

Dec. 4, 2012 (DE) ........................ 10 2012 222 231

(51) Int. Cl.

| | |
|---|---|
| ***H02J 7/00*** | (2006.01) |
| ***B60L 11/18*** | (2006.01) |
| ***B60L 3/00*** | (2006.01) |
| ***B60L 3/04*** | (2006.01) |

(52) U.S. Cl.

CPC ......... *B60L 11/1851* (2013.01); *B60L 3/0007* (2013.01); *B60L 3/0023* (2013.01); *B60L 3/0046* (2013.01); *B60L 3/04* (2013.01); *B60L 11/1809* (2013.01); *Y02T 10/7005* (2013.01); *Y02T 10/705* (2013.01); *Y02T 10/7072* (2013.01); *Y02T 90/14* (2013.01)

(58) Field of Classification Search

CPC .... Y02E 60/12; G01R 31/3648; H01M 10/44; H02J 7/0031; H02J 7/0047

USPC .......................................................... 320/127

See application file for complete search history.

(56) References Cited

U.S. PATENT DOCUMENTS

| | | | | |
|---|---|---|---|---|
| 3,829,249 | A * | 8/1974 | Pursley | 417/411 |
| 6,119,463 | A * | 9/2000 | Bell | B60H 1/00471 165/86 |
| 2004/0046673 | A1 * | 3/2004 | Kovarik et al. | 340/636.1 |
| 2005/0047921 | A1 * | 3/2005 | McLaughlin et al. | 417/18 |
| 2006/0176028 | A1 * | 8/2006 | Schulte et al. | 320/166 |
| 2011/0084498 | A1 * | 4/2011 | Lemus | 290/1 R |

FOREIGN PATENT DOCUMENTS

| | | |
|---|---|---|
| KR | 10-2007-0006000 A | 1/2007 |
| WO | 03/041208 A1 | 5/2003 |

* cited by examiner

*Primary Examiner* — Arun Williams

(74) *Attorney, Agent, or Firm* — Maginot, Moore & Beck LLP

(57) ABSTRACT

A mobile discharge device for a battery includes a first electrical connection configured to make contact with a first electrical terminal of the battery, a second electrical connection configured to make contact with a second electrical terminal of the battery, and an electrical resistor electrically connected firstly to the first electrical connection and secondly to the second electrical connection. The discharge device further includes a first fluid connection for connecting a fluid supply, a second fluid connection for connecting a fluid discharge line, and a fluid channel connected to the first fluid connection and the second fluid connection. The fluid channel is thermally coupled to the electrical resistor.

13 Claims, 2 Drawing Sheets

MOBILE DISCHARGE DEVICE FOR A BATTERY AND MOTOR VEHICLE COMPRISING A MOBILE DISCHARGE DEVICE

This application claims priority under 35 U.S.C. §119 to patent application no. DE 10 2012 222 231.6, filed on Dec. 4, 2012 in Germany, the disclosure of which is incorporated herein by reference in its entirety.

BACKGROUND

The present disclosure relates to a mobile discharge device for battery modules during emergency or service use and a motor vehicle for emergency or service uses which is connected to the mobile discharge device according to the disclosure.

In the case of a service or after an accident, there is a risk owing to the high amount of energy which is stored in drive batteries of electric motor vehicles. Discharging to a low SOC (state of charge) reduces the risk in the event of uncontrolled release of battery energy.

Safe and quick discharge of batteries after an accident is usually not possible since the power contactors of the battery can no longer be closed: if the battery management system (BMS) is still functioning, it will prevent closing of the contactors since it has already established a crash and possibly resultant defects. If the BMS is no longer functioning, the drive unit for the contactors has failed, with the result that the contactors likewise remain open. The open state is the failsafe state for the battery. In the event of an accident, however, hazardous reactions can occur in this state too, for example as a result of pack-internal short circuits, and these reactions should be reduced in terms of their severity by means of a discharge.

In addition, contactors or switches can also be brought out of operation by an accident.

Therefore, nowadays it is usually not possible to discharge a damaged battery without complicated dismantling of the battery and to bring the battery as quickly into a safe state at the site of the accident. It is particularly risky to transport still charged batteries since, during transport, short circuits can be triggered in the battery as a result of movement of torn-away battery components or cooling water which has flowed out, and these short circuits can result in a fire. It is therefore desirable to discharge the battery directly at the site of the accident without moving it before it is transported to a workshop.

WO 03/041208 A1 discloses a method for eliminating risks in connection with lithium-ion batteries using a heating resistor.

KR 102007006000 A discloses an extinguishing system for fighting a fire caused by an accident in modules of secondary batteries.

SUMMARY

The disclosure provides a mobile discharge device for a battery, which comprises a first electrical connection, preferably a standard male connector or a universal clamping contact for use with a wide variety of terminal geometries, for making contact with a first electrical terminal of a battery, a second electrical connection for making contact with a second electrical terminal of a battery, and an electrical resistor, which is electrically connected firstly to the first connection and secondly to the second connection, wherein the discharge device furthermore comprises a first fluid connection for connecting a fluid supply line, a second fluid connection for connecting a fluid discharge line, and a fluid channel, which is connected to the first fluid connection and the second fluid connection, wherein the fluid channel is thermally coupled to the electrical resistor.

A thermal coupling between the resistor and the fluid channel within the meaning of the present disclosure is preferably understood to mean a connection such that preferably at least 80% of the waste heat from the resistor is absorbed by the fluid channel.

The disclosure provides the advantage that a large amount of energy can be dissipated in a very short period of time without representing a hazard.

Preferably, lithium-ion rechargeable battery cells or other high-energy cells are considered to be battery cells.

Within the meaning of the present disclosure, preferably the first fluid connection is a connection to a cooling water intake and the second fluid connection is a connection to a cooling water drain.

A resultant advantage consists in that cooling water is environmentally sustainable and readily available.

In a preferred configuration of the disclosure, the cooling water intake comprises a hydrant connection.

One advantage results from the fact that hydrant water has a high pressure and therefore high volume flows of cooling water can be achieved, which corresponds to a correspondingly large amount of energy to be dissipated.

It is likewise possible for the discharge device to have a further resistor and a further pair of connections for making contact with an additional battery.

The advantage of a discharge device for discharging a plurality of batteries is the possibility of being able to simultaneously discharge all of the affected batteries in the case of service and thus to save time in comparison with a discharge with a serial battery sequence.

It is also possible for the discharge device to have an electrooptical display, which is designed to indicate a battery state.

One advantage is the possibility of influencing the discharge response, for example interrupting or preferably smoothly switching the discharge current on or off in order to avoid arcs.

In a particular embodiment, the electrooptical display is a light-emitting diode, which has a series resistance in order to be able to be operated directly on different voltages.

It has proven advantageous to thereby achieve a drive current which is optimal for the light-emitting diode.

In a particularly preferred variant, the electrical resistance is a zener diode, a transistor and/or an electrical resistor.

A resultant advantage consists in particular in the possibility of being able to establish a threshold value below which the light-emitting diode does not illuminate.

In accordance with a further aspect of the disclosure a motor vehicle comprising a mobile discharge device in accordance with one of the abovementioned features is disclosed, wherein the motor vehicle comprises the mobile discharge device and is connected to the discharge device.

One advantage consists in the possibility according to the disclosure of optimizing an emergency or service vehicle in respect of discharge uses.

In a preferred embodiment, the motor vehicle comprises a water tank, which is connected to the first fluid connection of the mobile discharge device.

One advantage achieved hereby is the possibility of being locally independent of the cooling water and therefore of the cooling water and a required pressure of the cooling water being stored on the emergency or service vehicle.

As an additional variant, preferably the upper side of the housing can be equipped with stop elements, such as shackles or ring-shaped eyelets.

This brings the advantage of being able to be moved by a standardized lifting gear.

In accordance with an advantageous variant, the mobile discharge device is designed for passive travel by means of, for example, steering rollers with a parking brake and is likewise equipped with a handle running peripherally horizontally around the housing in order to be able to be guided and held better by a human hand.

Preferably, the water channel in the device splits into a plurality of parallel channels and joins the many channels in front of the exit from the device to form one channel again.

It is also possible here for the water channel to take a meandering course through the device. The water channel is electrically insulated from, but thermally coupled well to the power resistor. This is possible, for example, as a result of a thermally conductive plastic.

The power resistor for discharging the battery cells is designed in such a way that a battery module can be discharged in a few minutes. For this, discharge rates of typically 5 C to 10 C are required, with the result that complete discharge can take place in 6 to 12 minutes. For the largest lithium-ion cells known nowadays with 60 Ah, therefore, discharge currents of 300 to 600 A are required. The power resistor is in the form of a wire-wound resistor with close thermal coupling to the water cooling channels.

In the case of a module voltage of typically 60 V and a discharge current of 600 A, the total resistance is therefore typically 0.1 ohm. It can be implemented by individual power resistors preferably connected in parallel.

Preferably, in order to activate the discharge operation, a power semiconductor is used.

BRIEF DESCRIPTION OF THE DRAWINGS

Exemplary embodiments of the disclosure will be explained in more detail with reference to the drawings and the description below. In the drawings.

DETAILED DESCRIPTION

Figure 1:
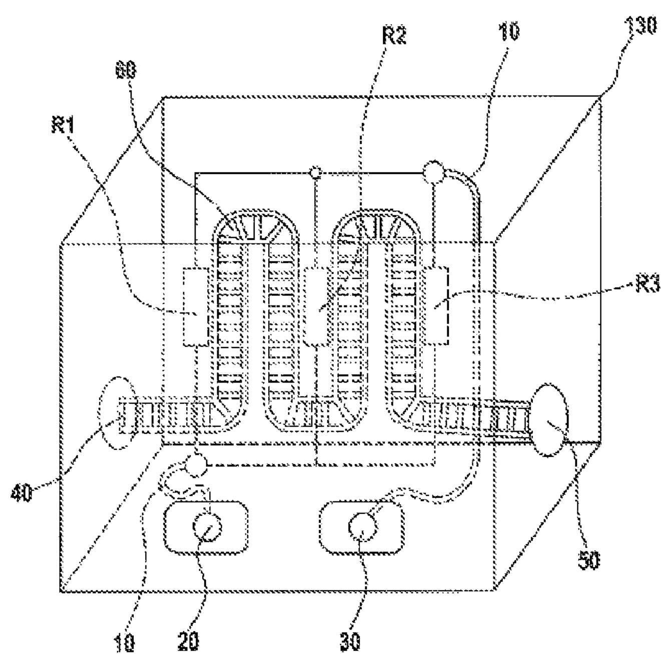
FIG. 1 shows a mobile discharge device in accordance with a preferred variant embodiment of the disclosure in a schematic perspective illustration.

FIG. 1 shows a three-dimensional, schematic illustration of a mobile discharge device comprising a cuboid housing 130.

Three electrical high-power resistors R1, R2, R3, a cooling water channel 60 and electrical connecting lines 10 for supplying power to the resistors R1, R2 and R3 are located within the housing 130.

The housing 130 surrounds the internal elements preferably completely, which results in an increase in the operational safety. The housing 130 is preferably electrically insulating.

A waste water connection 40, a cooling water connection 50, a first electrical connection terminal 20 and a second electrical connection terminal 30 are located on an outer side or on different outer sides of the housing 130.

The cooling water channel 60 takes a path which is as long as possible and is therefore meandering as close as possible to the high-power resistors R1, R2 and R3 in order to ensure good heat transfer from the resistors to the cooling water. The cooling water channel 60 is fed by the cooling water connection 50 and emptied by the waste water connection 40.

It is preferred for the sheath or the outer wall of the cooling water channel 60 to be connected thermally closely to, but electrically insulated from, the resistors R1, R2 and R3.

It is therefore particularly preferred that a surface configuration of the cooling water channel 60 in the region of the resistors R1, R2, R3 has an extent corresponding to the shape of the resistors R1, R2, R3, in which extent the resistors R1, R2, R3 are embedded. As a result, the efficiency of the cooling can be advantageously improved.

Preferably, the power resistors R1, R2 and R3 are activated via a power transistor or (in a simplified variant) a power contactor (possibly with series resistors), with the result that, when the contacts are plugged on, a high current flows, but not without any delay.

Figure 2:
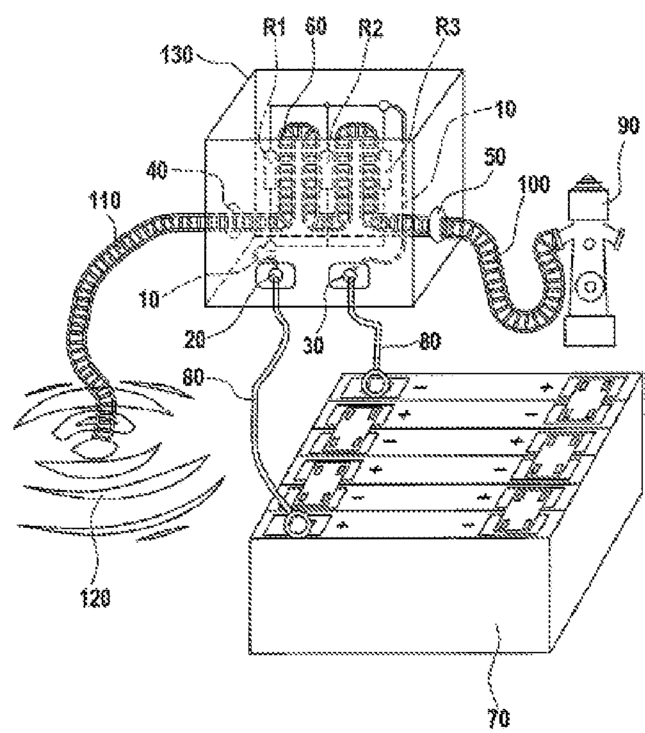
FIG. 2 shows a mobile discharge device connected to a battery in accordance with a likewise preferred variant embodiment of the disclosure in a schematic perspective illustration.

FIG. 2 shows a three-dimensional, schematic illustration of a mobile discharge device connected to a battery 70, said mobile discharge device comprising a cuboid housing 130.

A hydrant 90 feeds a cooling water hose 100, which is connected to the discharge device. A waste water hose 110 is connected to the discharge device in order to allow the waste water 120 to flow away.

Two electrical terminals of a battery 70 are connected to the discharge device by means of electrical connecting lines 80. In this case, preferably male connectors or universal terminals for making contact with the battery terminals are used.

The energy of the battery 70 to be discharged remains in the waste water 120.

In a preferred variant embodiment, a battery module with 13 cells in series (13s1p) is used.

In a preferred configuration, the light-emitting diode of the electrooptical display is connected to an electrical resistance or a zener diode in order to indicate the state of charge. It is preferred for the light-emitting diode to begin to illuminate above a module voltage of 20 V. If the light-emitting diode does not illuminate, a virtually completely discharged battery module is thus indicated.

Preferably, the following operating concept is used for an indication. Three light-emitting diodes and one pushbutton with a further light-emitting diode ("discharging") are arranged next to one another. The light-emitting diode 1 (red) indicates "out of range, use less cells!", which means that an operator has connected too many cells and therefore the voltage of the module to be discharged has exceeded 60 volts. Preferably, the device is not designed for this. If the pushbutton "start discharge" is deactivated, this means that a discharge process cannot be started. The operator now shifts the second contact by one cell and again observes the red light-emitting diode: this operation is repeated until the lamp extinguishes, i.e. the voltage of the contacted cells is below 60 volts. In the case where the light-emitting diode 2 (yellow) acts as an indicator, a voltage of between 20 volts and 60 volts is present at the contacted cells. In this case, the discharge operation can be started via the pushbutton. Once the pushbutton has been depressed, the light-emitting diode next to the pushbutton turns on and indicates "discharging". The power transistor (or power contactor) is activated, with the result that current flows via the power resistors.

In the case where the light-emitting diode 3 (green) illuminates, this indicates that a voltage of the contacted cells is below 20 volts, i.e. markedly below 2 volts per cell in the case of thirteen cells, which indicates that the cells have been exhaustively discharged and can no longer cause any damage. The light-emitting diode “discharging” is extinguished.

What is claimed is:

1. A mobile discharge device for a battery, comprising:

a first electrical connection configured to make contact with a first electrical terminal of the battery;

a second electrical connection configured to make contact with a second electrical terminal of the battery;

an electrical resistor electrically connected firstly to the first electrical connection and secondly to the second electrical connection;

a first fluid connection for connecting a fluid supply line;

a second fluid connection for connecting a fluid discharge line; and a fluid channel (i) connected to the first fluid connection and the second fluid connection, and (ii) thermally coupled to the electrical resistor.

2. The mobile discharge device according to claim 1, wherein the first fluid connection is a connection to a cooling water intake and/or the second fluid connection is a connection to a cooling water drain.

3. The mobile discharge device according to claim 2, wherein the cooling water intake includes a hydrant connection.

4. The mobile discharge device according to claim 1, further comprising:

a further resistor; and a further pair of connections configured to make contact with an additional battery.

5. The mobile discharge device according to claim 1, further comprising:

an electrooptical display configured to indicate a state of charge of a connected battery.

6. The mobile discharge device according to claim 5, wherein the electrooptical display includes a light-emitting diode.

7. The mobile discharge device according to claim 6, wherein the light-emitting diode is connected to an electrical resistance.

8. The mobile discharge device according to claim 7, wherein the electrical resistance is a zener diode, a transistor, and/or a nonreactive resistor.

9. A motor vehicle system comprising:

a vehicle including a battery; and a mobile discharge device for the battery including a first electrical connection configured to make contact with a first electrical terminal of the battery, a second electrical connection configured to make contact with a second electrical terminal of the battery, at least one electrical resistor electrically connected firstly to the first electrical connection and secondly to the second electrical connection, a first fluid connection for connecting a fluid supply line, a second fluid connection for connecting a fluid discharge line, and a fluid channel (i) connected to the first fluid connection and the second fluid connection, and (ii) thermally coupled to the at least one electrical resistor such that heat generated by the at least one electrical resistor is transferred to a fluid within the fluid channel, wherein the motor vehicle is connected to the discharge device.

10. The motor vehicle system according to claim 9, further comprising:

a water tank connected to the first fluid connection.

11. The motor vehicle system According to claim 9, further comprising:

a power transistor operatively coupled to the at least one electrical resistor, the power transistor configured to delay flow of current through the at least one electrical resistor.

12. The mobile discharge according to claim 11, wherein the cooling water intake includes a hydrant connection.

13. The mobile discharge device according to claim 1, further comprising:

a power transistor operatively coupled to the electrical resistor, the power transistor configured to delay flow of current through the electrical resistor.

* * * * *